United States Patent
To et al.

(10) Patent No.: US 10,268,050 B2
(45) Date of Patent: Apr. 23, 2019

(54) SPECTACLE LENS

(71) Applicants: Hoya Lens Thailand Ltd., Pathumthani (TH); The Hong Kong Polytechnic University, Kowloon (HK)

(72) Inventors: Chi Ho To, Kowloon (HK); Siu Yin Lam, Kowloon (HK); Takashi Hatanaka, Pathumthani (TH); Yasutake Masuda, Pathumthani (TH)

(73) Assignees: HOYA LENS THAILAND LTD., Pathumthani (TH); THE HONG KONG POLYTECHNIC UNIVERSITY, Kowloon (HK)

(*) Notice: Subject to any disclaimer, the term of this patent is extended or adjusted under 35 U.S.C. 154(b) by 232 days.

(21) Appl. No.: 14/935,322

(22) Filed: Nov. 6, 2015

(65) Prior Publication Data

US 2017/0131567 A1    May 11, 2017

(51) Int. Cl.
*G02C 7/06* (2006.01)

(52) U.S. Cl.
CPC ............ *G02C 7/06* (2013.01); *G02C 2202/24* (2013.01)

(58) Field of Classification Search
CPC ........ G02C 7/061; G02C 7/062; G02C 7/063; G02C 7/066; G02C 2202/24
USPC ....................................................... 359/159
See application file for complete search history.

(56) References Cited

U.S. PATENT DOCUMENTS

| | | | |
|---|---|---|---|
| 4,704,016 A | 11/1987 | de Carle | |
| 9,411,172 B2* | 8/2016 | Haddock | ............. G02B 5/1895 |
| 2003/0081172 A1 | 5/2003 | Dreher | |
| 2015/0109574 A1* | 4/2015 | Tse | .......................... G02C 7/042 |
| | | | 351/159.06 |
| 2015/0160477 A1* | 6/2015 | Dai | .......................... G02C 7/06 |
| | | | 351/159.42 |

FOREIGN PATENT DOCUMENTS

| | | |
|---|---|---|
| CN | 101713871 | 5/2010 |
| CN | 102692730 A | 9/2012 |

(Continued)

OTHER PUBLICATIONS

First Office Action dated Aug. 3, 2017 by the State Intellectual Property Office of the People's Republic of China for Patent Application No. 201310628174.8, which was filed on Nov. 29, 2013 and published as CN104678572 on Jun. 3, 2015 (Inventor—Hatanaka et al.; Applicant—Hoya Lens Thailand Ltd.) (Original: 10 pages // Translation: 15 pages).

*Primary Examiner* — Collin X Beatty
*Assistant Examiner* — Grant Gagnon
(74) *Attorney, Agent, or Firm* — Kilpatrick Townsend & Stockton LLP

(57) ABSTRACT

A spectacle lens can inhibit ametropia of the eyes and ensure full visibility. The spectacle lens comprises: first refraction areas and second refraction areas. Each first refraction area has a first refraction force that may be based on a prescription for correcting the ametropia of the eyes. Each second refraction area has a refraction force different from the first refraction force and may function to focus images on the positions except the retina of the eyes, to inhibit the development of the ametropia. Near the central part of the lens, the second refraction areas form a plurality of independent island-shaped areas, and the first refraction areas form the areas beyond the areas of the second refraction areas.

20 Claims, 6 Drawing Sheets

(56) References Cited

FOREIGN PATENT DOCUMENTS

| | | |
|---|---|---|
| CN | 104678572 A | 6/2015 |
| TW | 201211618 | 3/2012 |
| WO | 2009100257 | 8/2009 |

* cited by examiner

SPECTACLE LENS

TECHNICAL FIELD

Aspects of the present disclosure relate to a spectacle lens that suppresses progression of abnormal refractions (e.g., ametropia) caused by myopia and hyperopia in human eyes.

DESCRIPTION OF RELATED ART

Myopia, also known as near-sightedness and short-sightedness, is a condition of the eye where the light that comes in does not directly focus on the retina but in front of it, causing the image that one sees when looking at a distant object to be out of focus, but in focus when looking at a close object.

Myopia is most commonly corrected through the use of corrective lenses, such as glasses or contact lenses. It may also be corrected by refractive surgery, though there are cases of associated side effects. The corrective lenses have a negative optical power (i.e. have a net concave effect) which compensates for the excessive positive diopters of the myopic eye. Negative diopters are generally used to describe the severity of the myopia, as this is the value of the lens to correct the eye. High-degree myopia, or severe myopia, is defined as −6 diopters or worse.

Hyperopia is a condition of over-measured sight commonly known as being farsighted (American English) or longsighted (British English). Hyperopia is a defect of vision caused by an imperfection in the eye when the eyeball is too short or the lens cannot become round enough. This defect causes difficulty in focusing on near objects, and in extreme cases causing a sufferer to be unable to focus on objects at any distance. As an object moves toward the eye, the eye must increase its optical power to keep the image in focus on the retina. If the power of the cornea and lens is insufficient, as in hyperopia, the image will appear blurred.

People with hyperopia can experience blurred vision, asthenopia, accommodative dysfunction, binocular dysfunction, amblyopia, and strabismus, another condition that frequently causes blurry near vision. Presbyopes who report good far vision typically experience blurry near vision because of a reduced accommodative amplitude brought about by natural aging changes with the crystalline lens. It is also sometimes referred to as farsightedness, since in otherwise normally-sighted persons it makes it more difficult to focus on near objects than on far objects.

The causes of hyperopia are typically genetic and involve an eye that is too short or a cornea that is too flat, so that images focus at a point behind the retina.

SUMMARY

Aspects of the disclosure include a spectacle lens.
(1) A spectacle lens including:
a first refraction area having a first refractive power based on a prescription for correcting an abnormal refraction (e.g., ametropia) of an eye; and
second refraction areas having a refractive power different from the first refractive power, and having a function of focusing an image on a position other than a retina of the eye so as to suppress a progress of the abnormal refraction (e.g., ametropia) of the eye,
wherein the second refraction areas are formed as a plurality of respectively independent island-shaped areas in the vicinity of a center part of a lens, and
the first refraction area is formed as the area other than the areas formed as the second refraction areas.

(2) The spectacle lens according to (1), wherein the spectacle lens is the spectacle lens having a function of suppressing a progress of myopia, and the second refraction areas have a refractive power obtained by adding a positive refractive power to the first refractive power.

(3) The spectacle lens according to (1), wherein the spectacle lens is the spectacle lens having a function of suppressing a progress of myopia, and the second refraction areas have a refractive power obtained by adding a negative refractive power to the first refractive power.

(4) The spectacle lens according to any one of (1) to (3), wherein the area of each independent island-shaped second refraction area is 0.50 to 3.14 mm$^2$.

(5) The spectacle lens according to any one of (1) to (4), wherein the second refraction areas are formed in a circle area having a radius of 20 mm, with an optical center of the spectacle lens as a center.

(6) The spectacle lens according to any one of (1) to (5), wherein the second refraction areas are not formed in the circle area having a radius of 2.5 to 10.0 mm, with an optical center of the spectacle lens as a center.

(7) The spectacle lens according to any one of (1) to (6), wherein a ratio of total area of the second refraction areas, with respect to the total areas of the second refraction areas and the first refraction area, is 20 to 60% in an area formed by a mixture of the second refraction areas and the first refraction area.

(8) The spectacle lens according to any one of (1) to (3), wherein the second refraction areas are formed into circular shapes.

(9) The spectacle lens according to (4), wherein a diameter of each circular-shaped circle is 0.8 to 2.0 mm.

(10) The spectacle lens according to any one of (1) to (9), wherein the refractive power of the second refraction areas is differentiated from the refractive power of the first refraction area by differentiating surface shapes of the second refraction areas from a surface shape of the first refraction area.

(11) The spectacle lens according to (10), wherein the surface shapes of the second refraction areas are formed into convex or concave shapes toward an object side, with respect to the surface shape of the first refraction area.

(12) The spectacle lens according to any one of (1) to (9), wherein the second refraction areas have the refractive power different from the refractive power of the first refraction area by being made of a material different from the material of the first refraction area.

DETAILED DESCRIPTION

Figure 1:
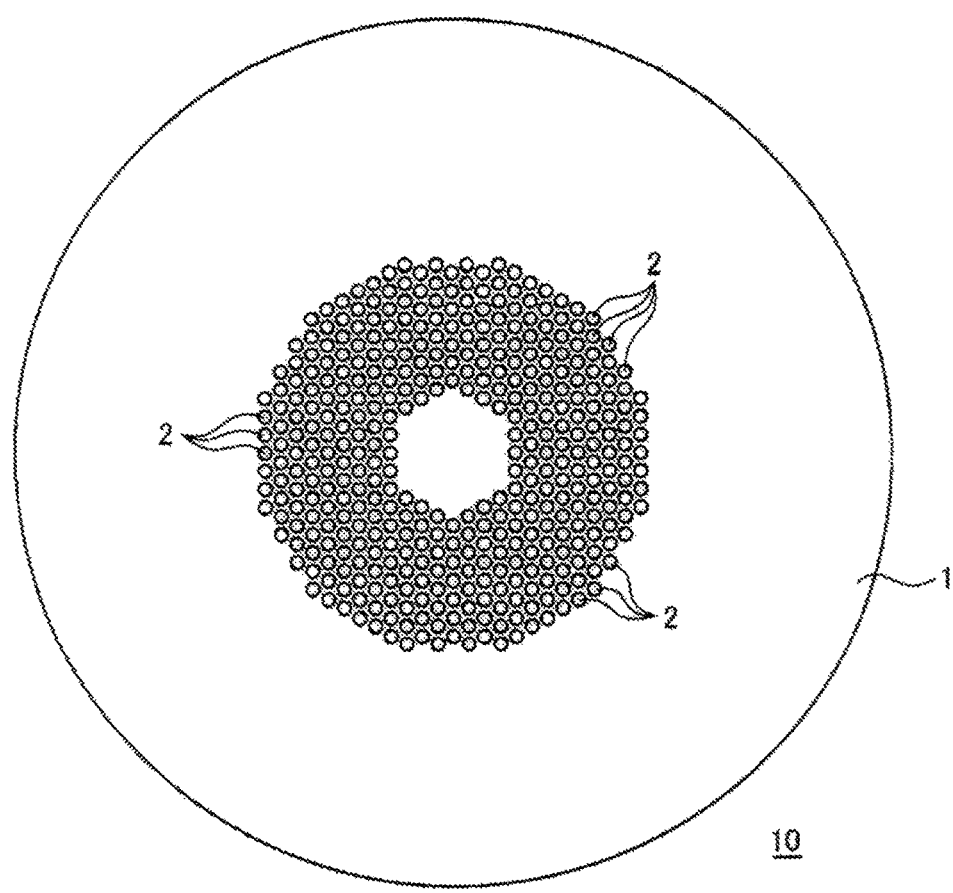
FIG. 1 is a plan view of the spectacle lens according to an embodiment of the present disclosure.

A lens described in Japanese Patent Publication No. 4891249 is known as the lens having the function of suppressing the progress of the abnormal refractions (e.g., ametropia) of myopia and hyperopia in human eyes.

The lens described is a concentric Fresnel multifocus lens. Namely, this lens is the lens in which a plurality of refraction areas are concentrically arranged, wherein at least one of these refraction areas as a first refraction area has a first refractive power based on a prescription for correcting the abnormal refraction (e.g., ametropia) of eyes. Then, the refraction areas other than the first refraction area respectively have at least one refractive power different from the first refractive power.

The refraction areas other than the first refraction area may be second refraction areas only having a second refractive power different from the first refractive power, or may be a plurality of refraction areas having a plurality of refractive powers different from each other, like third refraction areas having a third refractive power, and fourth refraction areas having a fourth refractive power, . . . other than the second refraction areas.

Then, in the above-mentioned lens, the areas having the first refractive power have a function of focusing an image on a retina of an eye. Meanwhile, for example, when constituting the lens for suppressing the progress of myopia, the refraction areas other than the refraction areas having the first refractive power, are formed of a material having the function of focusing the image on a point in front of the retina of the eye. Thus, if a patient uses the lens for suppressing myopia for viewing an object, an image of the object is formed on the retina while an image is formed on the point in front of the retina. Thus, an action of suppressing the progress of myopia can be obtained by the image formed in front of the retina by the refractive power other than the first refractive power, while visually recognizing the image of the object formed by the first refractive power.

Incidentally, the above-mentioned conventional lens is a so-called concentric Fresnel multifocus lens. Such a concentric multifocus lens has almost no problem when being applied to a case that the lens moves together with eyes like a contact lens and there is almost no change of a relative positional relation between the eyes and the lens.

However, when the concentric Fresnel multifocus lens is applied to a spectacle lens, there is no problem if an object is viewed by a visual line passing through a center of a lens. However, when a visual line passes through a position away from the center of the lens, an image of one object is formed in such a way that the image formed by the first refraction area and the image formed by the second refraction areas are viewed in a different direction respectively, resulting in viewing the object doubly, and it is difficult to use such a lens as the spectacle lens.

An aspect of the present disclosure is to provide a spectacle lens capable of exhibiting a function of suppressing the progress of the abnormal refraction (e.g., ametropia) of the eye while securing a sufficient visibility and an excellent wearing feeling.

In the above-mentioned structure, generally the first refraction area has the function of focusing the image on the retina of the eye. However, for example in a case of forming the lens of suppressing the progress of myopia, the second refraction areas are made of the material having the function of focusing the image on the point in front of the retina of the eye. Thus, when the patient uses the lens of suppressing the progress of myopia for viewing the object, an image of the object is formed on the retina while an image is formed in front of the retina. Namely, this lens has an action of suppressing the progress of myopia by the image in front of the retina, which is the action obtained by the refractive power other than the first refractive power, while visually recognizing the image of the object formed by the first refractive power. The same thing can be said for a case of hyperopia except for the following matter: the image is focused on a backside of the retina of the eye by the second refraction areas in the case of hyperopia.

Here, the second refraction areas are formed as a plurality of respectively independent island-shaped areas in the vicinity of the center part of the lens, wherein the first refraction area is formed as the area other than the areas formed as the second refraction areas.

Namely, a. the second refraction areas are formed in the vicinity of the center part, b. the second refraction areas are formed as a plurality of independent island-shaped areas, and c. the area other than the areas formed as the second refraction areas, is the first refraction area, to obtain the following effects.

d. In a state of viewing frontward, the visual line passes through the approximate center part of the lens for viewing the object, and therefore the object is viewed by a light beam passing through the plurality of second refraction areas arranged dispersedly so as to be included in the first refraction area, and a light beam passing through the first refraction area. As a result, this lens has the action of suppressing the progress of myopia by the image formed in front of the retina by the second refractive power, while visually recognizing the image of the object formed by the first refractive power.

e. When the eye moves, the visual line is deviated from the center part and passes through a peripheral part. However, the peripheral part is an area having the refractive power based on a prescription (i.e. an area having the first refractive power), and therefore the object can be excellently recognized. A wearer feels almost no discomfort even if the eye moves. Therefore, the function of suppressing the progress of the abnormal refraction (e.g., ametropia) of the eye can be exhibited, while securing a sufficient visibility and an excellent wearing feeling.

Figure 2:
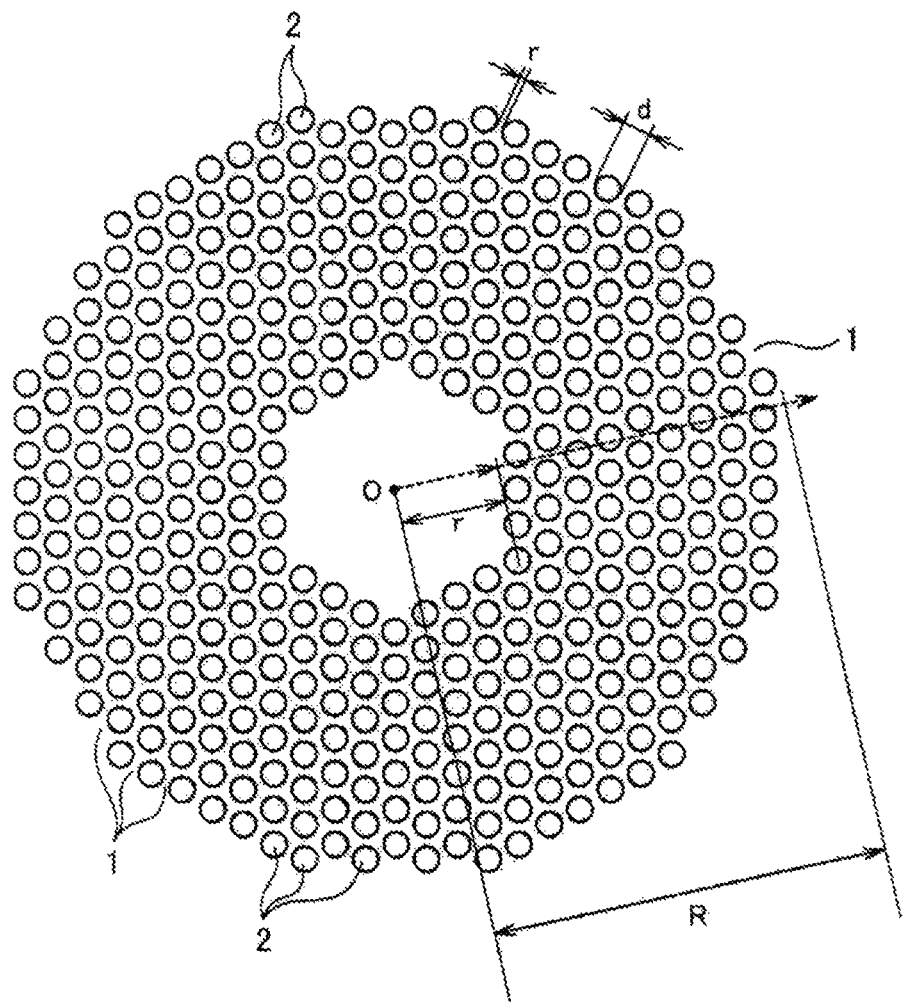
FIG. 2 is a partial expanded view of FIG. 1.
Figure 3:
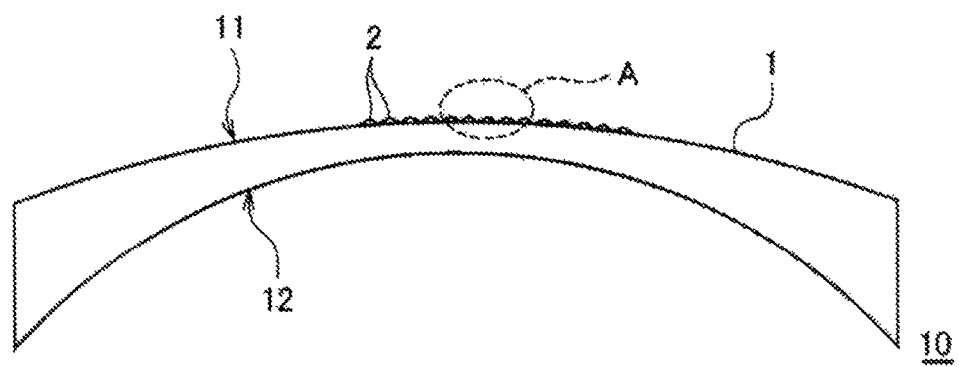
FIG. 3 is a cross-sectional view of the spectacle lens shown in FIG. 1
Figure 4:
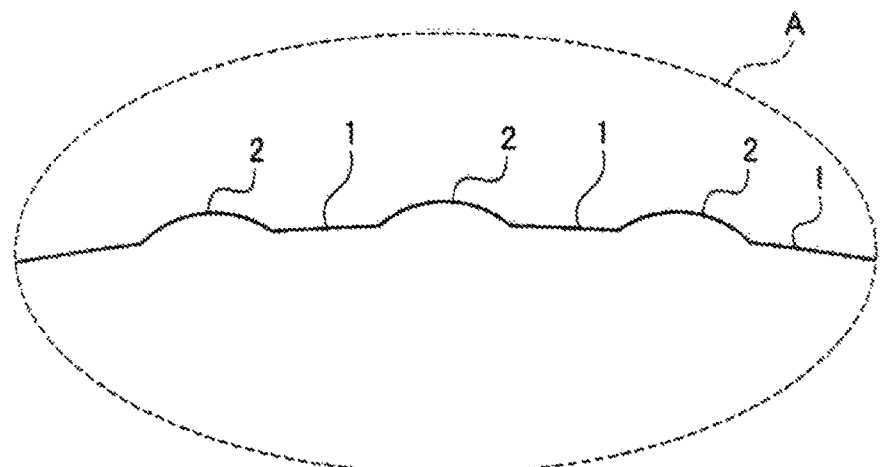
FIG. 4 is a partial expanded view of A-portion of FIG. 3.
Figure 5:
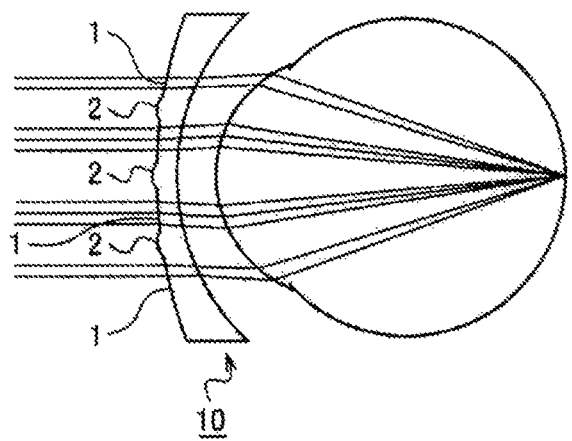
FIG. 5 is an explanatory view of a light beam locus of the spectacle lens according to an embodiment of the present disclosure, and is a view schematically showing a locus of the light beam passing through the first refraction areas.
Figure 6:
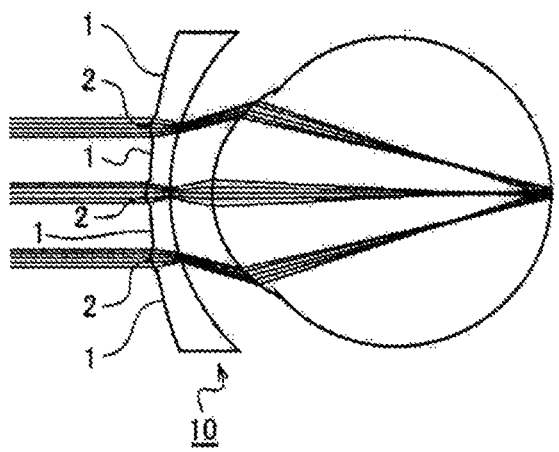
FIG. 6 is an explanatory view of the light beam locus of the spectacle lens according to an embodiment of the present disclosure, and is a view schematically showing the locus of the light beam passing through the second refraction areas.
Figure 7:
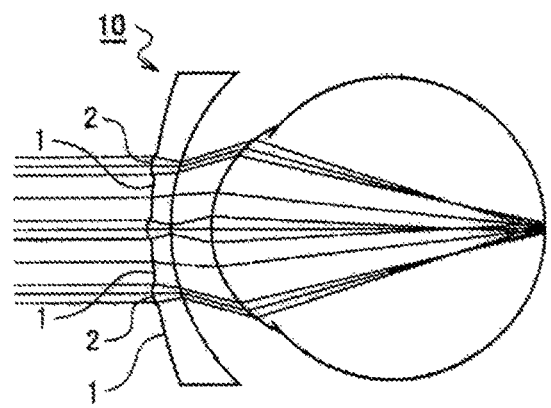
FIG. 7 is an explanatory view of the light beam locus of the spectacle lens according to an embodiment of the present disclosure, and is a view schematically showing the locus of the light beam passing through the first and second refraction areas.

FIG. 1 is a plan view of the spectacle lens according to an embodiment of the present disclosure; FIG. 2 is a partial expanded view of FIG. 1; FIG. 3 is a cross sectional view of the spectacle lens shown in FIG. 1; FIG. 4 is a partial expanded view of A-portion of FIG. 3; FIG. 5 is an explanatory view of a light beam locus of the spectacle lens according to an embodiment of the present disclosure, and is a view schematically showing a locus of the light beam passing through the first refraction areas; FIG. 6 is an explanatory view of the light beam locus of the spectacle lens according to an embodiment of the present disclosure, and is a view schematically showing the locus of the light beam passing through the second refraction areas; and FIG. 7 is an explanatory view of the light beam locus of the spectacle lens according to an embodiment of the present disclosure, and is a view schematically showing the locus of the light beam passing through the first and second refraction areas. A vision correcting spectacle lens according to the embodiment of the present disclosure will be described hereafter, with reference to the drawings.

As shown in FIG. 1 to FIG. 4, a spectacle lens 10 of this embodiment is the lens having the action of suppressing the progress of myopia while correcting myopia, and is a meniscus concave lens with an object side surface 11 formed as a convex curved surface toward an object side, and an eye side surface 12 formed into a concave surface having a larger curvature than the curvature of the object side surface 11. Such a spectacle lens 10 has a first refraction area 1 having a first refractive power based on a prescription for correcting myopia, and second refraction areas 2 formed as a plurality of respectively independent island-shaped areas in the vicinity of a center part of the lens.

As shown in cross-sectional views of FIG. 3 and FIG. 4, the object side surface of each second refraction area 2 is formed into a convex spherical surface shape toward the object side having a larger curvature than the curvature of the object side surface of the first refraction area 1. Thus, the refractive power of the second refraction areas 2 is larger than the first refractive power of the first refraction area by 2.00 D to 5.00 D. Accordingly, as shown in FIG. 5, an image is focused on a retina of an eye in the first refraction area, and meanwhile as shown in FIG. 6, the image is focused on a point in front of the retina in the second refraction areas 2. FIG. 7 shows a light beam locus in both of the first refraction area and the second refraction areas.

Each surface of the second refraction areas 2 formed as a plurality of island-shaped areas has an area of about 0.50 to 3.14 mm$^2$, and has a circular shape having a diameter d of about 0.8 to 2.0 mm. The plurality of island-shaped second refraction areas 2 are approximately evenly arranged in the vicinity of the center of the lens in a way to be separated from each other by a distance almost equal to a value of a radius d/2.

The plurality of island-shaped second refraction areas 2 are formed in a way to be included in a circular area having a radius R (20 mm or less) with an optical center O as a center of the lens, and are arranged in a way to form a hexagon inscribed in a circle having a radius R for example. Here, the second refraction areas 2 are not arranged as circular areas having a radius 2.5 to 10.0 mm with the optical center O of the spectacle lens as the center. Then, a ratio of total area of the second refraction areas, with respect to the total areas of the second refraction areas and the first refraction area, is 20 to 60% in an area formed by a mixture of the second refraction areas and the first refraction. Thus, a sufficient visibility can be maintained and an excellent wearing feeling can be obtained, while securing the function of suppressing the progress of myopia.

Figure 8:
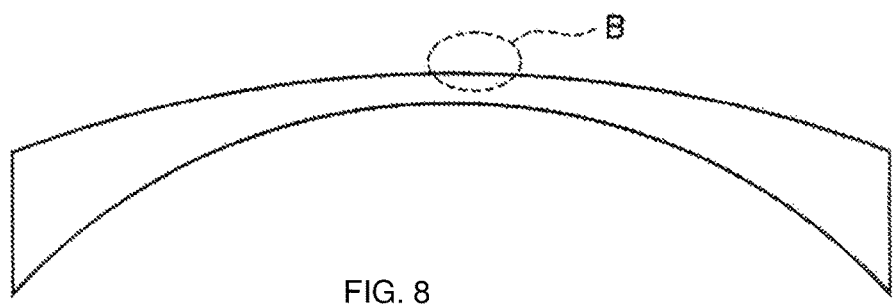
FIG. 8 is a cross-sectional view of the spectacle lens according to another embodiment of the present disclosure.
Figure 9:
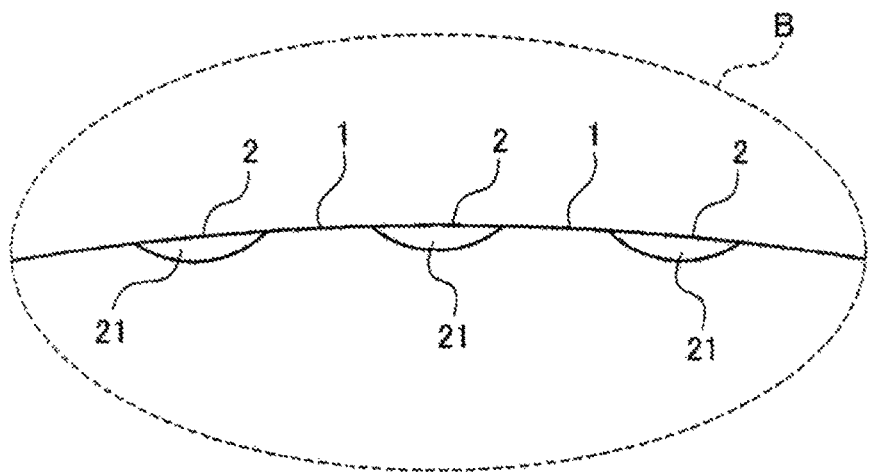
FIG. 9 is a partial expanded view of B-portion of FIG. 8.

FIG. 8 is a cross-sectional view of the spectacle lens according to another embodiment of the present disclosure, and FIG. 9 is an expanded view of B-portion of FIG. 8. In the spectacle lens shown in these figures, a part of the second refraction areas 2 is made of a material different from the material for constituting the first refraction area 1. Namely, as shown in FIG. 9, a high refractive material part 21 having a large refractive index, is provided in the second refraction areas 2 in an approximately plano-convex shape inward from surfaces of the second refraction areas 2 in a thickness direction. With this structure as well, the same function as the function of the second refraction areas of the above-mentioned embodiment can be obtained. In this case, as the material constituting the first refraction area 1, for example a plastic material being CR39 material made of thermosetting allyl resin having a refractive index of 1.5 can be used, and as the high refractive material, for example a plastic material made of thermosetting polythiourethane resin having a refractive index of 1.67 can be used.

Figure 10:
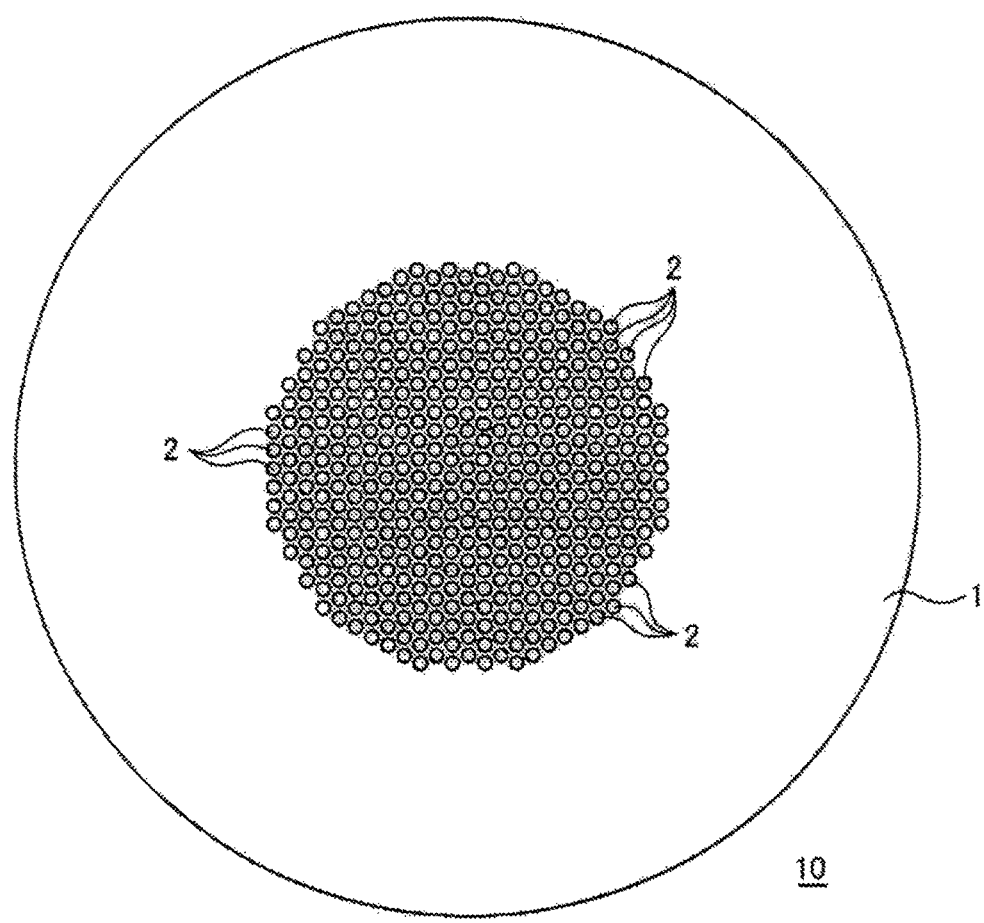
FIG. 10 is a plan view of the spectacle lens according to yet another embodiment of the present disclosure.

FIG. 10 is a plan view of the spectacle lens according to yet another embodiment of the present disclosure. In the spectacle lens of the embodiment shown in FIG. 1, the island-shaped second refraction areas are not configured in the circle area having a radius of 2.5 to 10.0 mm, with an optical center of the spectacle lens as a center, while in this embodiment, as shown in FIG. 10, the island-shaped second refraction areas are also configured in the circle area having a radius of 2.5 to 10.0 mm, with an optical center as a center. The other structure includes the same structure as the embodiment shown in FIG. 1, and therefore detailed explanation thereof is omitted. The effect of the present disclosure can be sufficiently obtained by this embodiment as well.

The above-mentioned embodiment shows the example in which the refraction areas other than the first refraction area are formed as the second refraction areas only having the second refractive power different from the first refractive power. However, these refraction areas may be a plurality of refraction areas respectively having a plurality of refractive powers different from each other, like the third refraction areas having the third refractive power, and the fourth refraction areas having the fourth refractive power . . . . In this case, this plurality of refraction areas are suitably dispersed in the area in which the above-mentioned second refraction areas are configured.

DESCRIPTION OF REFERENCE NUMBERS

1 First refraction area
2 Second refraction area
10 Spectacle lens
11 Object side surface
12 Eye side surface
21 High refractive index material part

What is claimed is:

1. A spectacle lens comprising:
a first refraction area having a first refractive power based on a prescription for correcting an abnormal refraction of an eye; and
second refraction areas having a refractive power different from the first refractive power, and having a function of focusing an image on a position other than a retina of the eye so as to suppress a progress of the abnormal refraction of the eye,
the second refraction areas are non-concentrically formed as a plurality of respectively independent island-shaped areas near a center of the spectacle lens, the second refraction areas occupy less than 80% of a surface of the spectacle lens, and
the first refraction area is formed as the area other than the areas formed as the second refraction areas.

2. The spectacle lens according to claim 1, wherein a ratio of total area of the second refraction areas, with respect to the total areas of the second refraction areas and the first refraction area, is 20 to 60% in an area formed by a mixture of the second refraction areas and the first refraction area.

3. The spectacle lens according to claim 1, wherein the second refraction areas are formed into circular shapes.

4. The spectacle lens according to claim 1, wherein the second refraction areas have the refractive power different from the refractive power of the first refraction area by being made of a material different from the material of the first refraction area.

5. The spectacle lens according to claim 1, wherein the spectacle lens is the spectacle lens having a function of suppressing a progress of myopia, and the second refraction areas have a refractive power obtained by adding a positive refractive power to the first refractive power.

6. The spectacle lens according to claim 5, wherein the area of each independent island-shaped second refraction area is 0.50 to 3.14 mm$^2$.

7. The spectacle lens according to claim 5, wherein the second refraction areas are formed into circular shapes.

8. The spectacle lens according to claim 1, wherein the spectacle lens is the spectacle lens having a function of suppressing a progress of hyperopia, and the second refraction areas have a refractive power obtained by adding a negative refractive power to the first refractive power.

9. The spectacle lens according to claim 8, wherein the area of each independent island-shaped second refraction area is 0.50 to 3.14 mm$^2$.

10. The spectacle lens according to claim 8, wherein the second refraction areas are formed into circular shapes.

11. The spectacle lens according to claim 1, wherein the second refraction areas are formed in a circular area having a radius of 20 mm, with an optical center of the spectacle lens as a center of the circular area.

12. The spectacle lens according to claim 11, wherein the second refraction areas are not formed in a circular area having a radius of 2.5 to 10.0 mm and an optical center of the spectacle lens as its center.

13. The spectacle lens according to claim 1, wherein the second refraction areas are not formed in a circular area having a radius of 2.5 to 10.0 mm, with an optical center of the spectacle lens as a center of the circular area.

14. The spectacle lens according to claim 13, wherein a ratio of total area of the second refraction areas, with respect to the total areas of the second refraction areas and the first refraction area, is 20 to 60% in an area formed by a mixture of the second refraction areas and the first refraction area.

15. The spectacle lens according to claim 1, wherein the refractive power of the second refraction areas is differentiated from the refractive power of the first refraction area by differentiating surface shapes of the second refraction areas from a surface shape of the first refraction area.

16. The spectacle lens according to claim 15, wherein the surface shapes of the second refraction areas are formed into convex or concave shapes toward an object side, with respect to the surface shape of the first refraction area.

17. The spectacle lens according to claim 1, wherein the area of each independent island-shaped second refraction area is 0.50 to 3.14 mm$^2$.

18. The spectacle lens according to claim 17, wherein the second refraction areas are formed in a circular area having a radius of 20 mm, with an optical center of the spectacle lens as a center of the circular area.

19. The spectacle lens according to claim 17, wherein a diameter of each circular-shaped circle is 0.8 to 2.0 mm.

20. The spectacle lens according to claim 19, wherein the refractive power of the second refraction areas is differentiated from the refractive power of the first refraction area by differentiating surface shapes of the second refraction areas from a surface shape of the first refraction area.

* * * * *